Dec. 12, 1933.  W. G. HOELSCHER  1,938,906
LATHE HEADSTOCK
Filed April 27, 1932  12 Sheets-Sheet 2
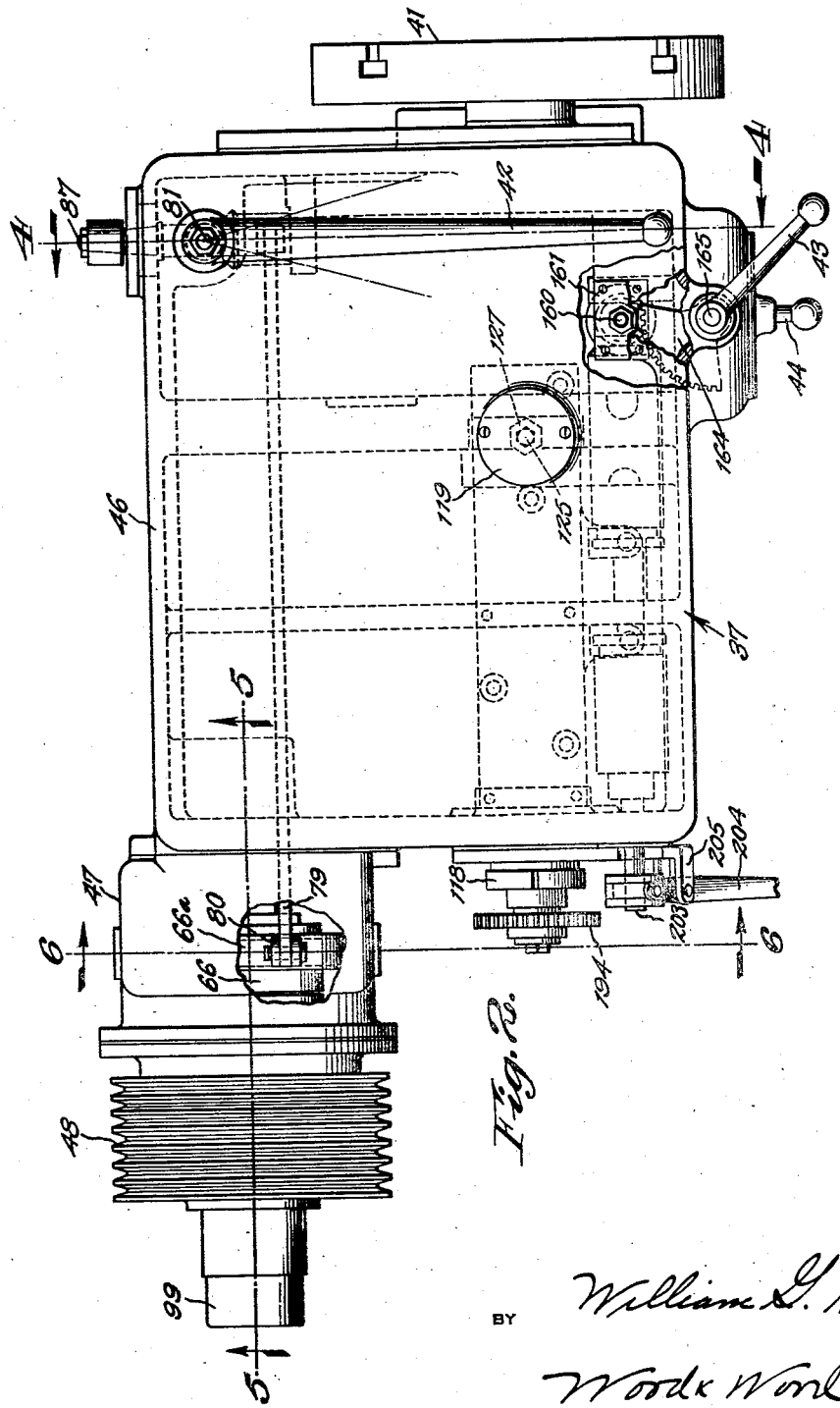

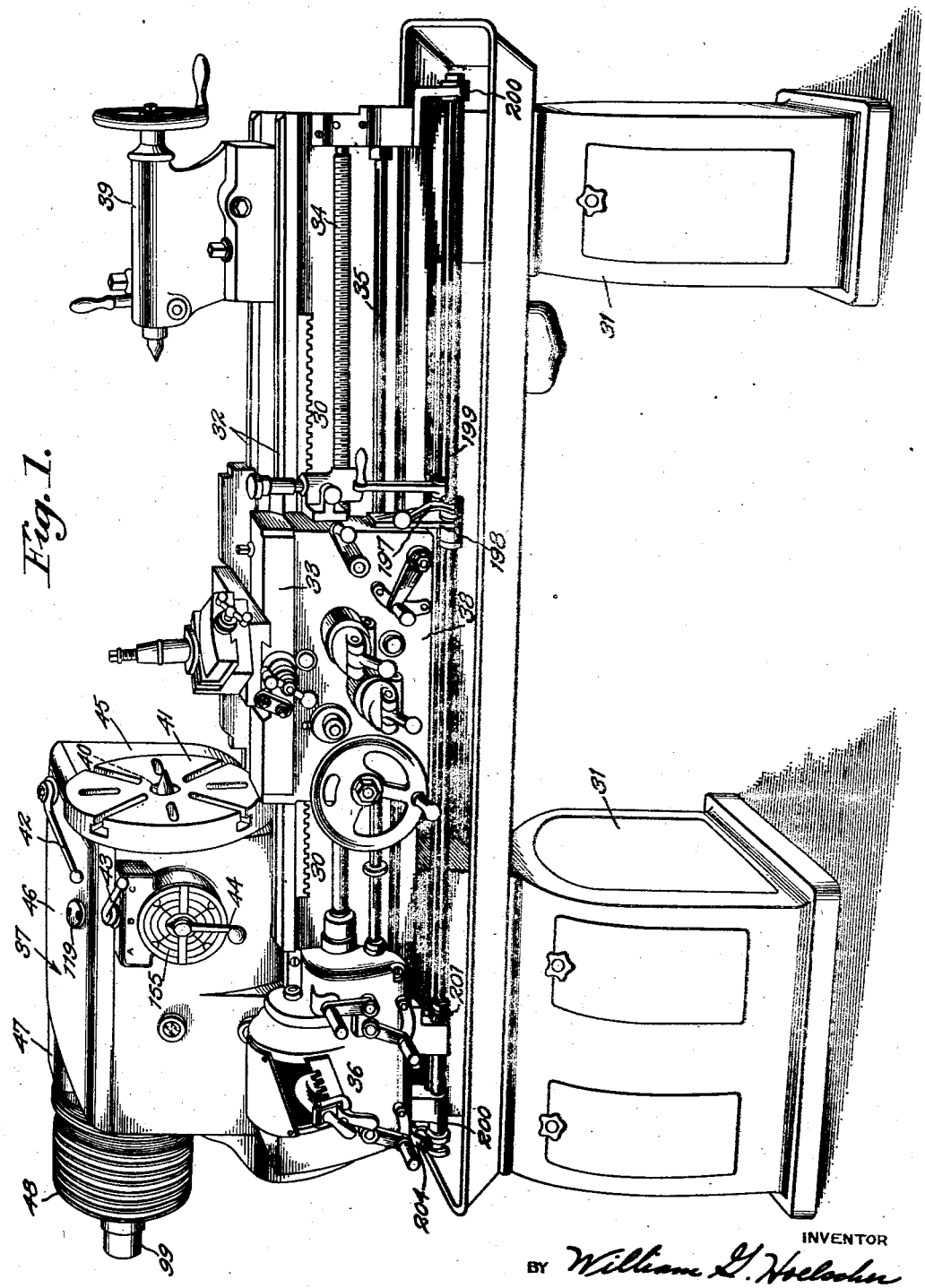

Dec. 12, 1933.  W. G. HOELSCHER  1,938,906
LATHE HEADSTOCK
Filed April 27, 1932   12 Sheets-Sheet 3
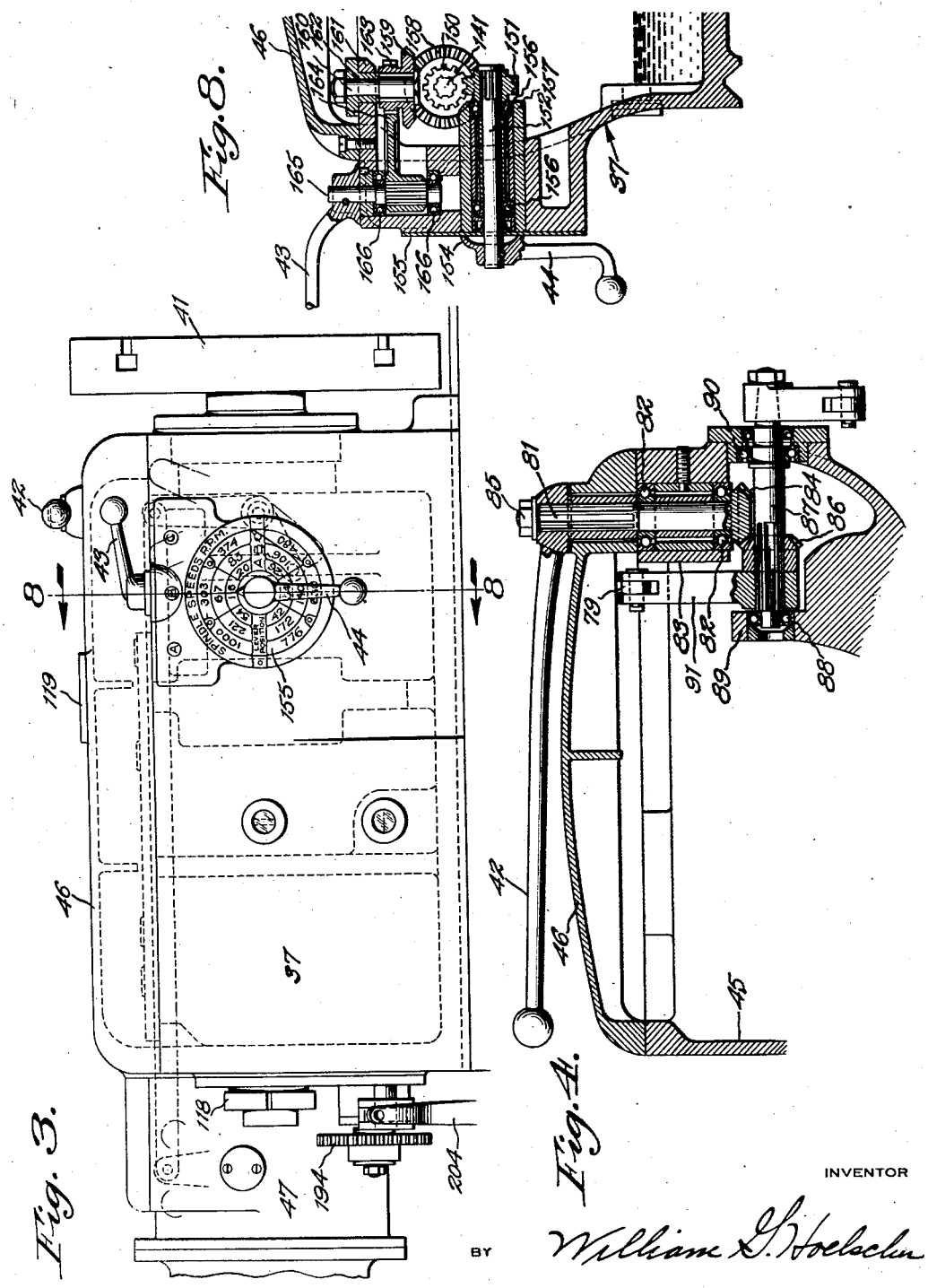
INVENTOR
William G. Hoelscher
BY
Word & Word   ATTORNEYS

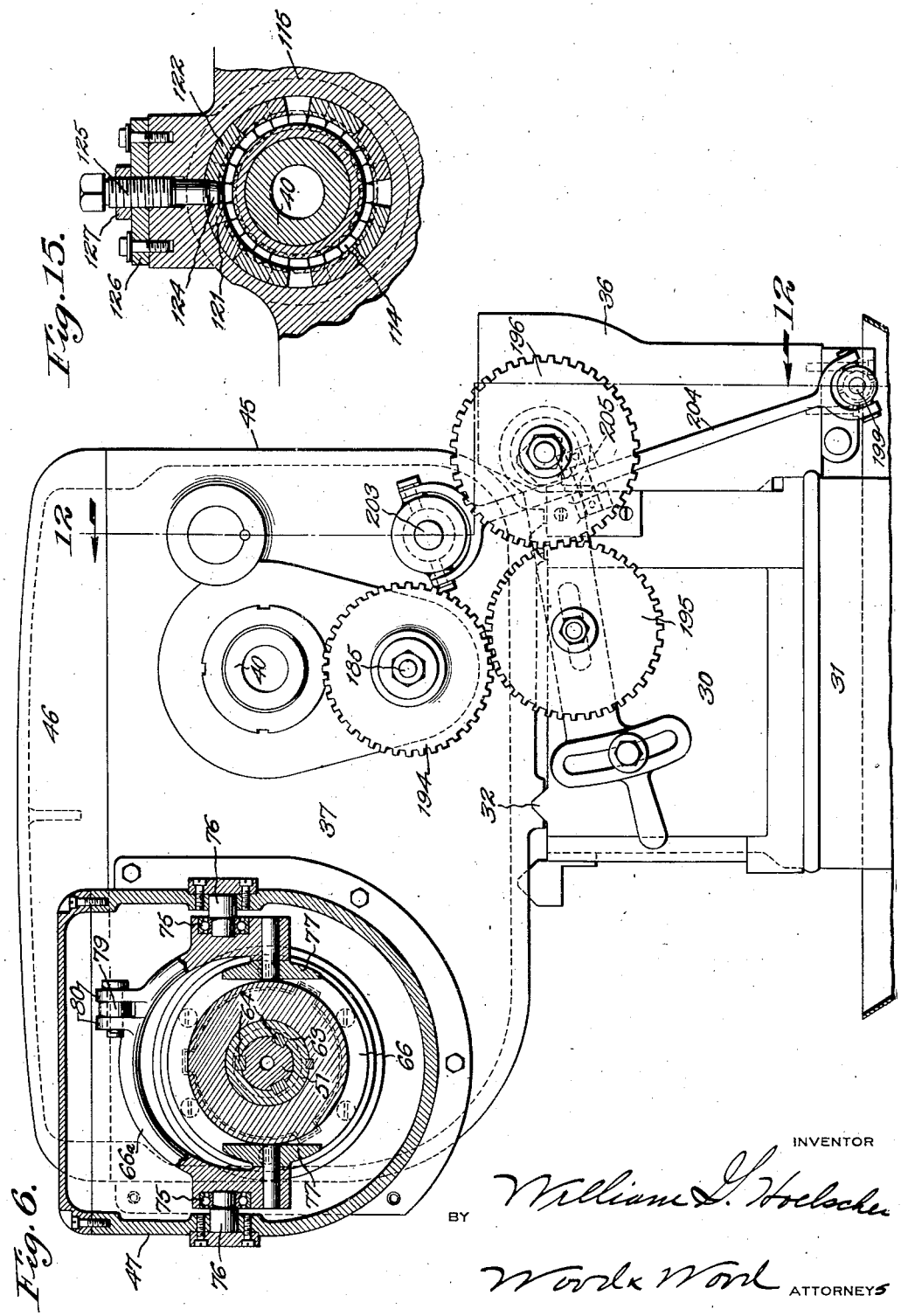

Dec. 12, 1933.  W. G. HOELSCHER  1,938,906
LATHE HEADSTOCK
Filed April 27, 1932  12 Sheets-Sheet 6
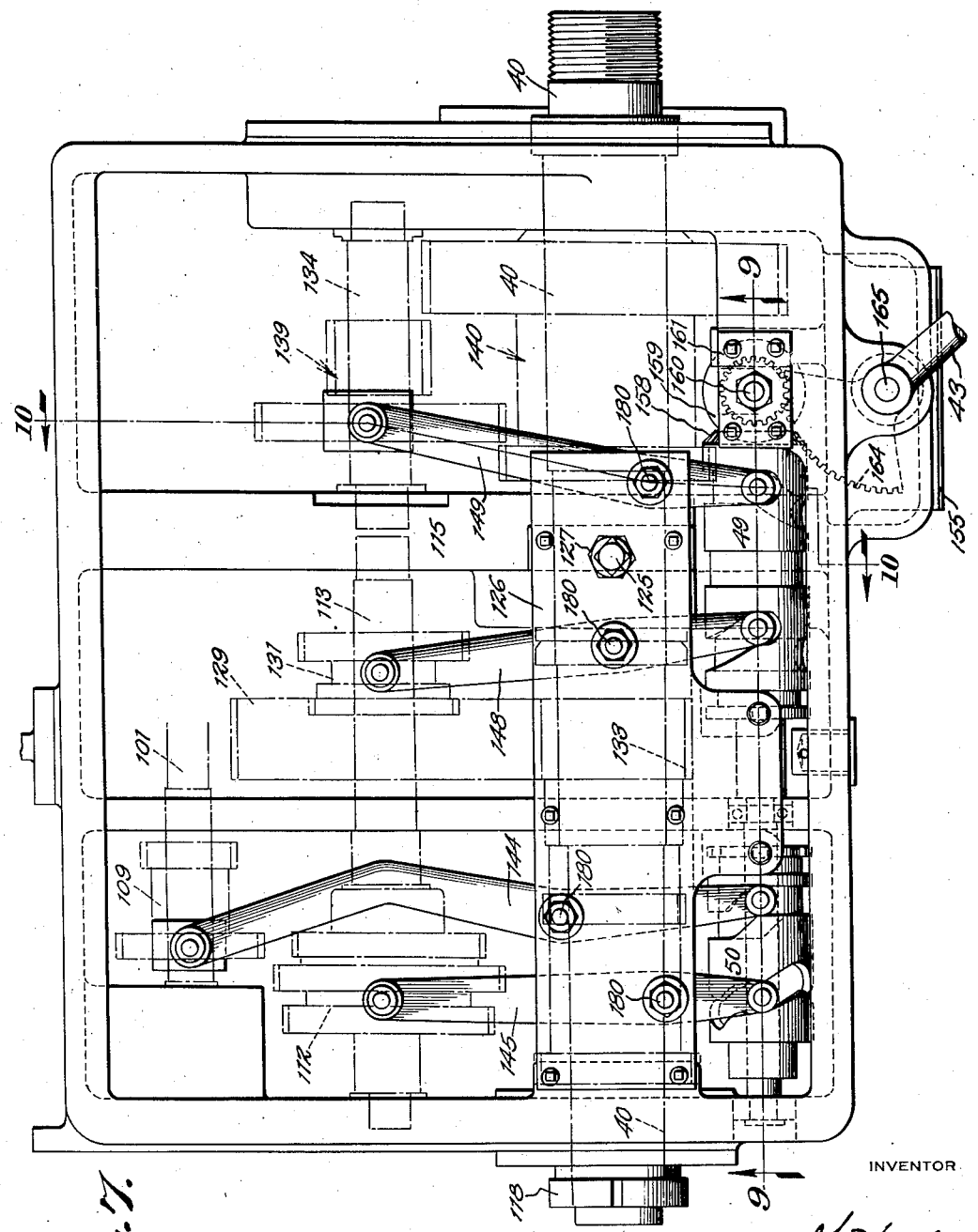

Dec. 12, 1933.                    W. G. HOELSCHER                    1,938,906
                                   LATHE HEADSTOCK
                         Filed April 27, 1932         12 Sheets-Sheet 7
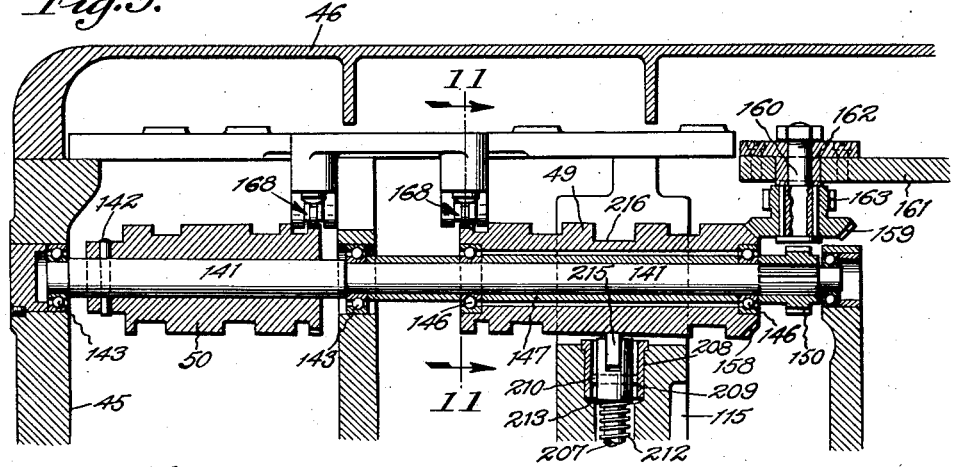
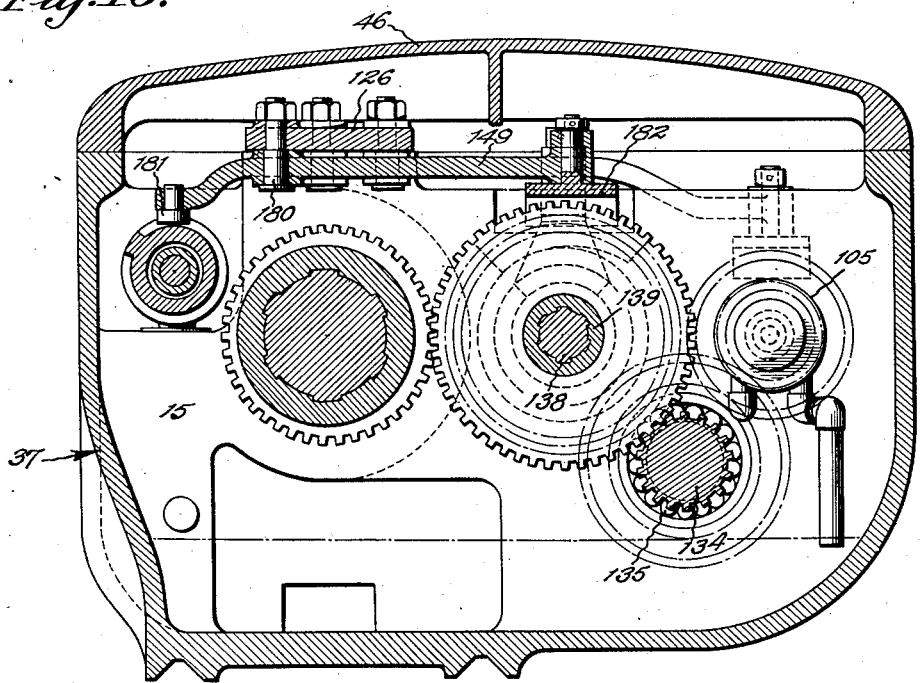
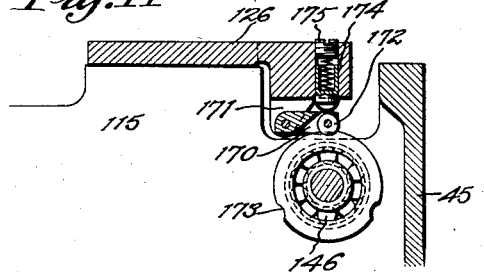
INVENTOR
William G. Hoelscher
BY
Word & Word ATTORNEYS

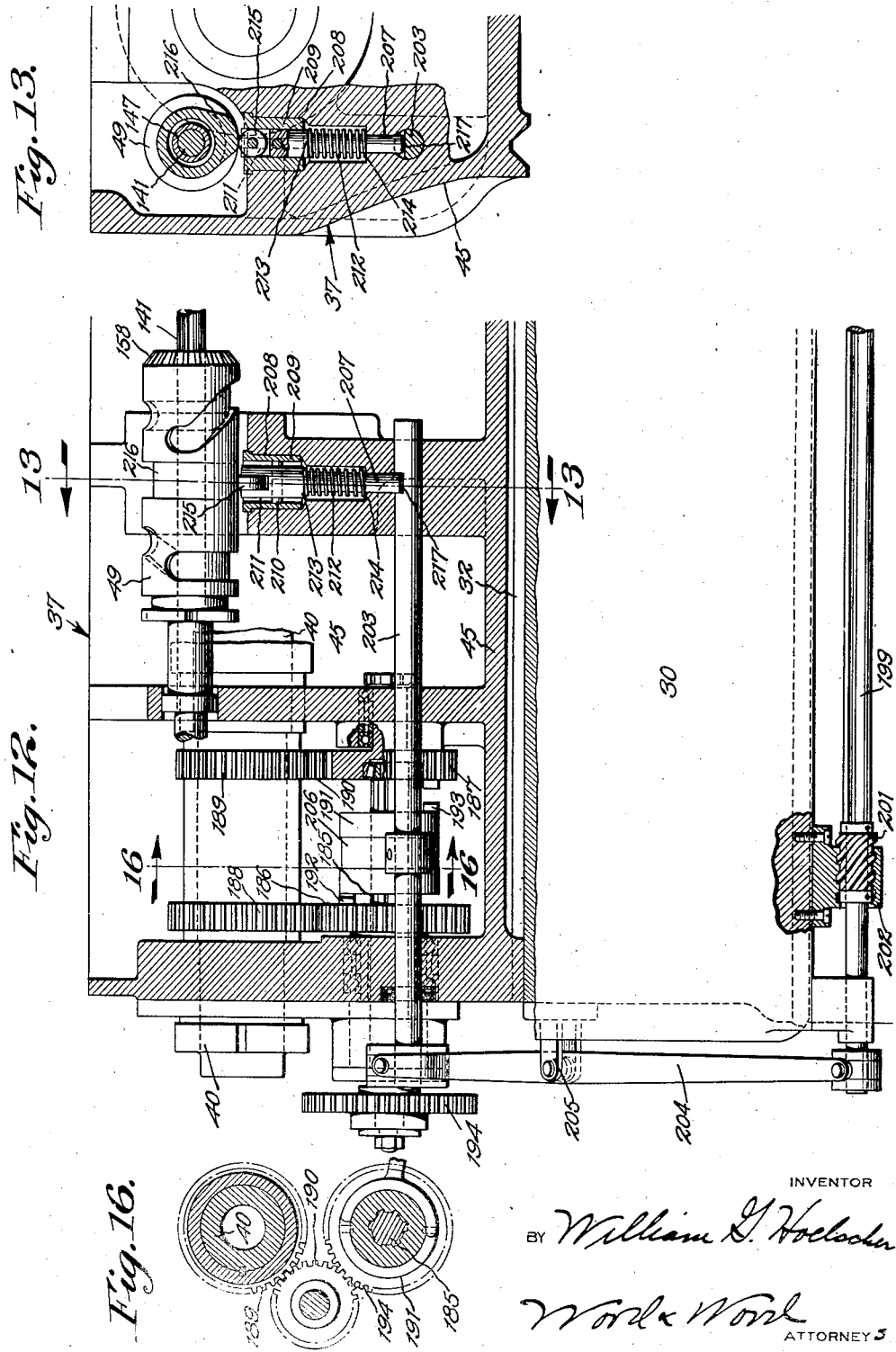

Dec. 12, 1933.  W. G. HOELSCHER  1,938,906
LATHE HEADSTOCK
Filed April 27, 1932  12 Sheets-Sheet 10

INVENTOR
BY William G. Hoelscher
Wood & Wood ATTORNEYS

Dec. 12, 1933.  W. G. HOELSCHER  1,938,906
LATHE HEADSTOCK
Filed April 27, 1932   12 Sheets-Sheet 11

INVENTOR
BY *William G. Hoelscher*

*Wood & Wood* ATTORNEYS

Dec. 12, 1933.  W. G. HOELSCHER  1,938,906
LATHE HEADSTOCK
Filed April 27, 1932   12 Sheets-Sheet 12

INVENTOR
William G. Hoelscher
BY Wood & Wood ATTORNEYS

Patented Dec. 12, 1933

1,938,906

UNITED STATES PATENT OFFICE 1,938,906

LATHE HEADSTOCK

William G. Hoelscher, Norwood, Ohio, assignor to The American Tool Works Company, Cincinnati, Ohio, a corporation of Ohio Application April 27, 1932. Serial No. 607,827

25 Claims. (Cl. 82—29)

This invention relates to machine tools and is particularly directed to an improved lathe headstock and control means. With the advent of high speed tools constructed of tungsten or tantalum carbide, radical changes have become necessary in the driving equipment and control for machine tools, particularly the transmission for driving the spindle of the lathe, for the purpose of developing high speeds. In the development of a high speed transmission, it has been necessary at the same time to include safety and wear reducing appliances for protecting the gearing and the control apparatus during periods of extreme high speed operation. Moreover, there has been a greater necessity for a wider speed range, that is, it has become necessary to include in a drive which provides average speeds, extremely high speeds for acquiring the maximum benefit of the tungsten or tantalum carbide tool in output and machine efficiency.

To accomplish this purpose, the present invention provides an improved transmission and control means which has greater selectivity and ease of control. Although a wide speed range has been installed as a part of the improved headstock of this invention, the transmission has been simplified and the control is of a nature readily and quickly operated.

To accomplish the improvement, the present gear arrangement includes a series of speeds which are compactly and conveniently effected and multiplied or reconstituted by a series of speed ranges through the use of two levers, one being a speed control lever, and the other a speed range control lever, these levers being closely associated and including a common and direct reading dial. The readings of the dial are provided so that the operator can readily change to any speed of those included with maximum ease and efficiency.

It is an additional object to provide that the control levers for the headstock, including the speed and speed range control levers and the clutch control lever for the headstock, are all located within a small compass and directly before the operator. It is also provided that when the extreme high speed range is being used, the low and intermediate speed range gearing is at rest or is eliminated from the train in motion, thereby preventing wear and eliminating the undue vibration and noise which would otherwise be attendant the operation of those gears which are not under driving load.

A further object is that all of the gear shafts in the headstock are short stub shafts placing the bearings for the shafts of the transmission close to the gears, and the spindle is provided with an intermediate bearing in addition to the end bearings, the aforesaid bearing arrangement preventing deflection of the spindle and the shafts and eliminating torsion. Moreover, the intermediate bearing is disposed in relation to the end bearing of the spindle at the work supporting end thereof, and these bearings are disposed for taking spindle thrusts, whereby temperature change causing elongation of the spindle will not loosen the spindle bearings.

It is a further object to provide an interlock between the lathe carriage transmission control means and the spindle speed range control means, whereby it is impossible to operate the reversing gearing, which drives the carriage, at the time that the high speed range is being used for driving the spindle, thus protecting the reversing gearing against the considerable strain which would be imposed on it in the event of a shift during high spindle speed.

It is intended that the present headstock lends itself readily to the use of a variable speed motor in lieu of the speed change gearing which is provided, with the speeds of the variable speed motor multiplied by the use of the speed range control lever as set forth.

Other objects and further advantages will be more fully apparent from a description of the accompanying drawings, in which:

Figure 1 is a general perspective view illustrating a lathe incorporating the improved headstock and control means of this invention.

Figure 2 is a top plan view of the headstock.

Figure 3 is a side view of the headstock, a portion of the end thereof being broken away.

Figure 4 is a sectional view taken on line 4—4, Figure 2, detailing the clutch actuating lever and connection.

Figure 6 is a sectional view taken on line 6—6, Figure 2, further detailing the clutch and showing an end view of the lathe incorporating the present headstock.

Figure 7 is a top plan view of the headstock with the cover removed for illustrating the gear shifting levers and cams.

Figure 8 is a sectional view taken on line 8—8, Figure 3, illustrating the gear shifting levers and connections.

Figure 9 is a sectional view taken on line 9—9, Figure 7, illustrating the gear shifting cams or tumblers.

Figure 10 is a sectional view taken on line 10—10, Figure 7, illustrating certain of the gears and gear shifting levers.

Figure 11 is a sectional view taken on line 11—11, Figure 9, detailing one of the detent devices for definitely setting the gear shifting means.

Figure 12 is a sectional view taken on line 12—12, Figure 6, detailing the interlock between the gear shifting means and the carriage feed control means for preventing reversal of the carriage feed when the spindle is being driven in the high range of speed.

Figure 13 is a sectional view taken on line 13—13, Figure 12, further detailing the interlock mechanism shown in Figure 12.

Figure 15 is a sectional view taken on line 15—15, Figure 14, detailing the adjustment means for the spindle.

Figure 16 is a sectional view taken on line 16—16, Figure 12, illustrating the reversing gear for the carriage feed transmission.

Figures 17 to 22 inclusive are diagrammatic views illustrating the position of the gearing in six of the eighteen speeds.

Figure 23:
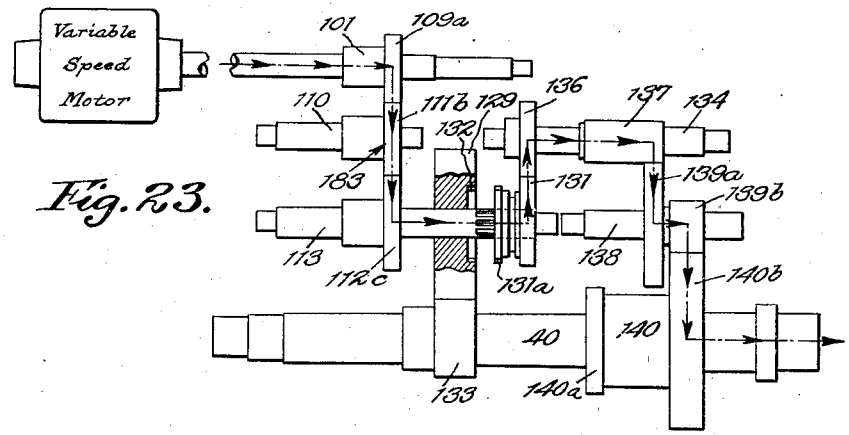
Figure 24:
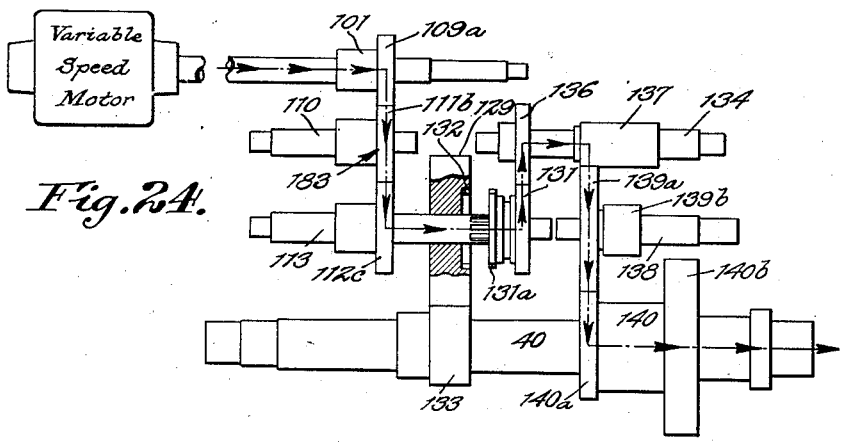
Figure 25:
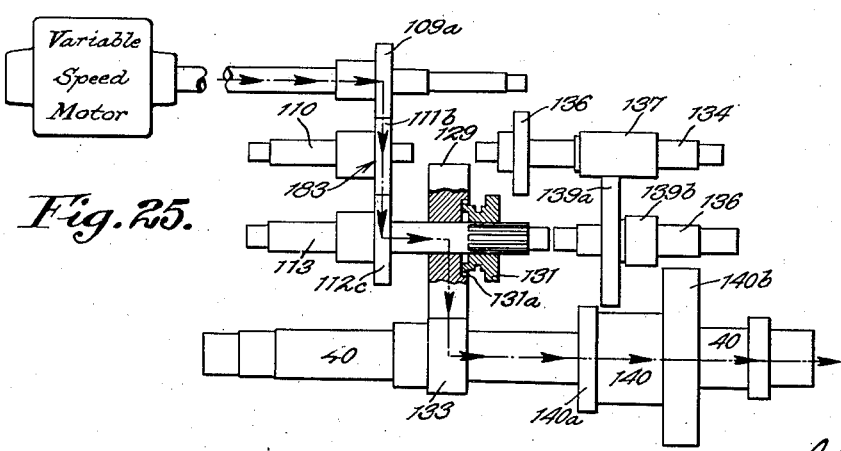

Figures 23 to 25 inclusive are diagrammatic views illustrating the positions of the gearing when the shifting is simplified and only a speed range control cam or tumbler is operated in conjunction with a variable speed motor for obtaining the speed changes.

A lathe is shown generally in Figure 1 of the drawings, incorporating the headstock of the present invention and including the conventional parts. The lathe bed 30 is supported on legs or standards 31 and includes ways 32 upon which a carriage 33 is mounted for movement longitudinally of the bed, this carriage being moved on the ways by means of a lead screw 34 and a feed shaft 35 disposed parallel with and at the side of the lathe, the lead screw and feed shaft being driven from a feed box 36 in transmission connection with the gearing of the headstock 37 at one end of the lathe and in operative connection with the carriage 33 through an apron transmission 38 depending from the carriage. The usual tailstock 39 is included at the opposite end of the lathe from the headstock. In view of the consideration that the present invention is particularly concerned with improvements in the headstock and carriage feed control, no further description will be appended in regard to the remainder of the lathe than is necessary to an understanding of the application of the present invention.

The headstock, as shown in the details of the present case, is belt driven although it will be understood that a direct motor drive may be used. The application of each form of drive will be brought out later in the description.

The ultimate drive through the headstock is to the spindle 40 and the face plate 41 mounted at the inner side of the headstock, the drive being controlled through three levers, a clutch control lever 42, and two speed control levers 43, 44, one 43 for the speed ranges and other 44 for the speeds of the ranges, all of these levers being directed toward the feed box and carriage apron side of the lathe and having their handles located within a small compass so that the operator may conveniently manipulate the same without changing his position.

Figure 5:
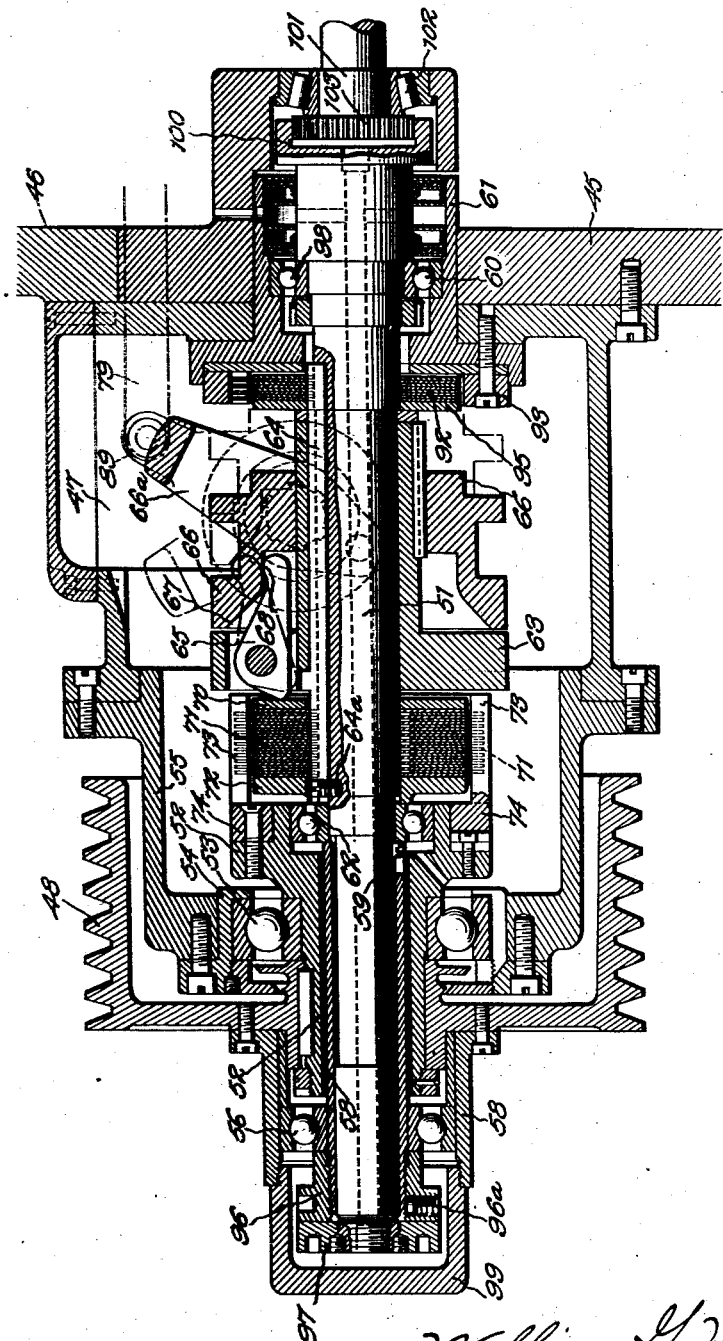
Figure 5 is a sectional view taken on line 5—5, Figure 2, detailing the clutch construction.
Figure 14:
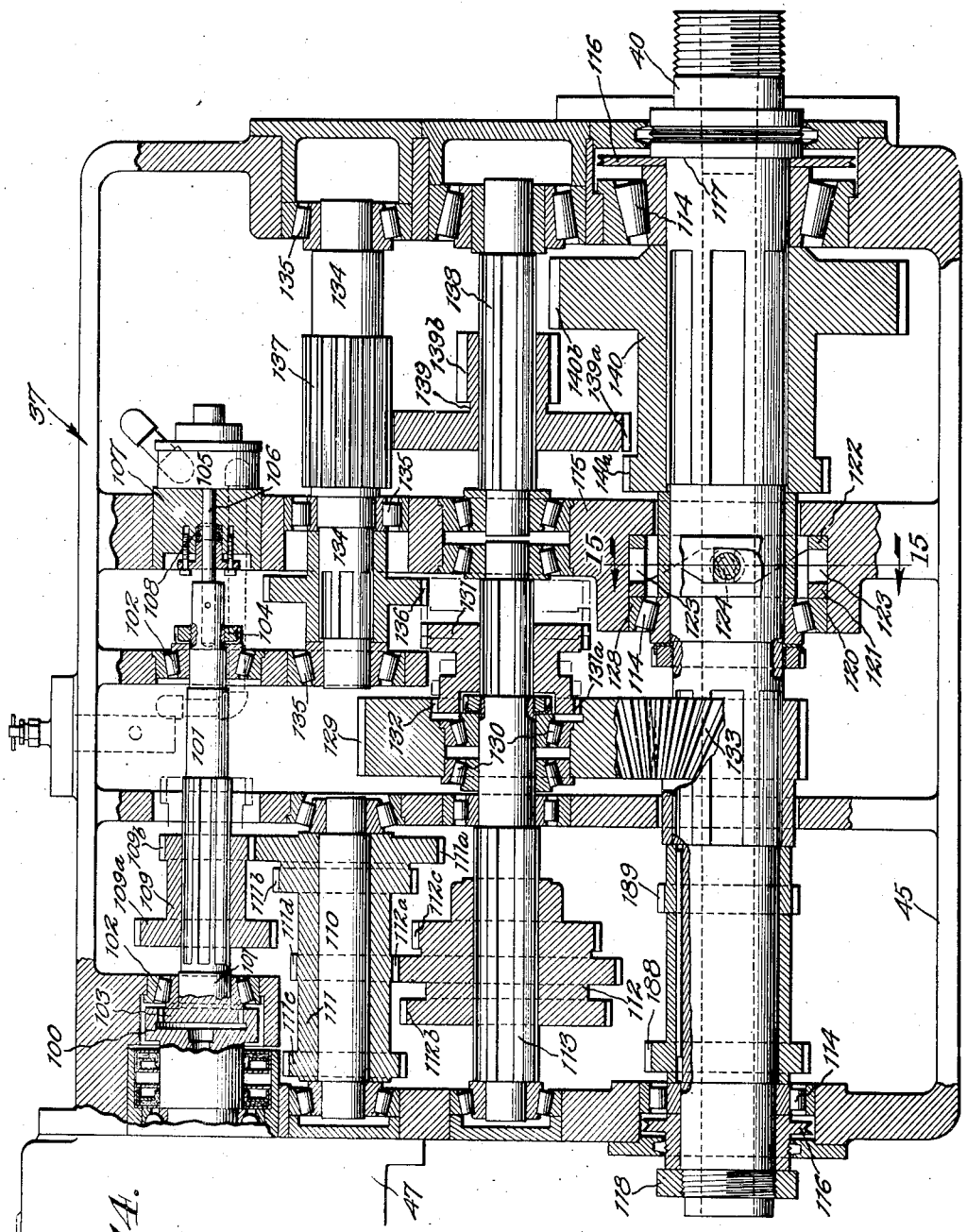
Figure 14 is a diagrammatic layout of the headstock gearing showing the shafts spread out in the same plane for fully illustrating the gear train.

The headstock casing 45 is secured on the ways 32 of the bed in the usual manner and has a removable cover 46 thereon. The interior of the headstock casing includes a series of internal cross walls particularly illustrated in Figure 14 for rigidly supporting the spindle 40 and the various short shafts of the transmission. The case 47 of the clutch unit is bolted to the outer face of the main headstock casing and mounts a driving pulley 48.

In the particular embodiment of the invention which is fully illustrated herein, the headstock transmission provides eighteen speeds for the spindle in three ranges of six each. The speed ranges and the speeds of each range are controlled and the appropriate shifts made through the medium of cams 49, 50, namely cam 49 for the speed ranges and the cam 50 for the speeds of the ranges.

*Power control clutch*

Describing the transmission in detail, a main drive shaft 51 is journalled in the clutch housing 47 and in the forward wall of the headstock casing 45. The mechanism of the clutch is contained within the clutch housing adjacent the driving connection. In the present instance the drive pulley 48 is designed for operation by a plurality of cone belts and is keyed to a driving sleeve 52 journalled in a ball bearing 53 supported in a ball bearing bracket 54 bolted to an end cover plate 55 of the clutch housing 47.

The drive shaft 51 is journalled in ball bearings. In the instance of the forward end, a ball bearing 56 is mounted in the hub 57 of the pulley and the shaft 51 is supported in this ball bearing 56 on a sleeve 58 rotatably attached to the shaft by means of a set screw 59. In the instance of the rear or inner support for the drive shaft, a ball bearing 60 is mounted in a sleeve 61 supported in the end wall of the clutch housing 47 and the wall of the headstock casing 45. A ball bearing 62 for intermediately supporting the shaft 51 is mounted in the driving sleeve 52.

The clutch consists of a headed sleeve 63 which is fixed on the drive shaft 51 through the medium of long keys 64 fixed against longitudinal movement and carries a series of circumferentially placed trip dogs 65 pivotally mounted for radial movement. These trip dogs 65 are actuated by means of a sliding collar 66 in splined sliding connection on the headed sleeve and including a recess 67 in its face adjacent the extended rounded ends 68 of the trip dogs 65. This recess has a tapered mouth adapted to engage over the rounded ends of the trip dogs for swinging the same downwardly toward the shaft center and moving their cam shaped outer ends 69 against a thrust plate 70 clamping a series of clutch plates 71 against a second thrust plate 72 abutting the ball bearing 62 which supports the drive shaft at an intermediate point.

Half of the clutch plates 71 are in rotative connection with spline fingers 73 extending from a driving ring 74 bolted to the driving sleeve 52, these fingers being parallel with the drive shaft and passing through notches in the edges of the clutch plates. The other half of the clutch plates 71 and the thrust plates 70, 72 are in splined connection with the long spline keys 64 of the drive shaft mentioned previously so that the effect of forcing the plates 71 together is to connect the driving sleeve 52 to the drive shaft 51. The spline keys 64 are set against longitudinal displacement by means of set screws 64a in the drive shaft, one at the end of each key.

The slide collar 66 is translated by means of a pivoted yoke lever 66a (see Figure 6) mounted by means of ball bearings 75 on studs 76 secured in the side walls of the clutch housing. Blocks 77 are disposed in a circumferential groove 78 of the clutch shifting collar 66 and rotatably mounted on the ends of the shifting yoke below the pivotal mounting thereof. The clutch shifting yoke 66a is operated by means of a link 79 pivoted between lugs 80 at its upper end and extended through the transmission or headstock housing to the operating lever 42.

The operating lever 42 is extended over the cover or lid of the headstock casing (see Figure 4) and has its hub loosely extended through the cover or lid and in splined connection upon a shaft 81 which is journalled in a ball bearing assembly 82 in a lug 83 of the headstock casing. This shaft 81 carries a bevel gear 84 on its lower end. The hub of the lever is fixed between a nut 85 and the ball bearing assembly 82. The bevel gear 84 meshes with a companion bevel gear 86 keyed on a shaft 87 journalled in and between roller bearings 88 respectively disposed in a lug 89 of the headstock casing and in a journalled cap 90 fixed in the wall thereof. An arm 91 extends outwardly from keyed connection on this shaft and has the extended end of the link 79 pivotally attached thereto. The shifting handle 42 extends well over the top of the headstock casing and is disposed adjacent the gear shifting levers 43, 44.

A brake is provided for stopping the idle motion of the transmission after the clutch has effected a disconnection of the drive, this brake consisting of a series of clutch plates 92, half of which are in rotatively keyed connection with a key ring 93 fixed to the bearing support 61 at the inner end of the drive shaft, a thrust plate 94 being secured under this key ring. The other half of the clutch plates 92 are splined to the drive shaft by means of the long keys 64 previously mentioned as well as an outer thrust plate 95. This thrust plate 95 is engaged by the end of the clutch shifting collar 66 when moved out of clutching position and the effect thereby is to clutch the drive shaft to the frame of the head stock.

An adjustment means for the clutch is provided at the outer end of the clutch housing and consists of a nut 96 in screw-threaded connection on the end of the bearing sleeve 58 of the drive shaft and engaging between the end bearing 56 and a nut 97 screwed on a counterturned screw-threaded portion at the extreme outer end of the drive shaft. Rotation of the nut 96 in the outward direction abuts it against the outer nut 97 and translates the sleeve 58, the effect being to move the sleeve 58 against the intermediate ball bearing and consequently to adjustably move the thrust plate 72 toward the clutch thus taking up the working clearances between the clutch plates. This adjustment of the nut 96 is made when the clutch is operative for connecting the drive and is accomplished by turning the same by means of a wrench to secure driving contact between the plates of the clutch. The nut is thereafter set by means of a screw 96a. The drive shaft is fixed against translative or longitudinal movement by means of the nut 97 drawing a shoulder 98 thereof against the end bearing 60 which is fixed to the frame. A hub cap 99 for the pulley 48 covers the adjustment nut 96.

*Spindle driving transmission*

At the point where the drive shaft enters the head-stock casing, an internal tooth connection 100 is provided to an extension 101 of the drive shaft, permitting convenient attachment and removal of the clutch unit bodily from the headstock merely by disconnecting its casing from the headstock casing.

The section 101 of the drive shaft which is located in the headstock casing (see Figure 14) is journalled in roller bearings 102, 102 in the internal wall structure thereof. This section is maintained against displacement by the headed or toothed end 103 thereof which bears against the particular roller bearing 102 and a nut 104 screwed on the opposite end thereof against the adjacent roller bearing 102. A lubricant pump 105 is directly driven by means of a stud or pump shaft 106 extended axially from this shaft, a suitable pump support 107 and packing 108 for the drive shaft extension being provided. The direct drive for the pump is used instead of gearing since there is no lateral thrust on the pump shaft as would occur if the pump shaft were axially offset from the drive shaft and gears used to connect the power shaft and pump shaft.

A compound gear 109 is in splined connection on this shaft and includes two gears 109a, 109b, large and small respectively, this compound gear therefore having two positions for speed change. The next adjacent transmission shaft is a stub shaft 110 disposed in roller bearings and mounted between the outer wall of the headstock casing and an inner cross wall thereof. This shaft carries a compound gear 111 providing four gears 111a, 111b, 111c, 111d, large to small respectively. The larger two of these gears are component to the compound gear on the drive shaft, namely, the gears 111a and 111b. The other two 111c and 111d, in addition to one of the first two namely 111b, are component respectively to each of three gears 112a, 112b, 112c, large to small respectively, of a compound gear 112 in splined connection on the next transmission shaft 113. The gear 111 is fixed on the intermediate stub shaft 110 and the shaft has a ball bearing mounting.

It will be noted that through these compound gears 109, 111, 112, six speed changes may be imparted to the last mentioned shaft 113. It will be noted at this time that these six changes represent the six speed changes for each of the three speed ranges and are controlled by the cam 50. These six speed changes are tripled by the other control cam 49 through the medium of gearing which will be hereinafter described.

The spindle 40 to which all of the speeds are directed is mounted at one side of the headstock casing and has three supports consisting of roller bearings 114 in each end wall of the headstock casing and in a heavy intermediate or cross wall 115. In both instances of end bearing installation, oil rings 116 are included for preventing oil leakage at the ends of the spindle, it being believed that full description need not be given in connection with these rings since they are of conventional design.

The spindle 40 is maintained in position against longitudinal displacement by means of a shoulder 117 at its inner end lying against the adjacent bearing and a nut 118 on its outer end screwed into position and bearing against its adjacent bearing through an oil ring. The intermediate bearing 114 which is a tapered roller bearing includes an adjustment device for the purpose of accurate take-up of this bearing in the prevention of spindle deflection. One end bearing 114 of the spindle is a tapered roller bearing whereas the other is a straight roller bearing. The end bearing and the intermediate bearing, which are tapered, are inclined toward each other so that an outward adjustment movement on the cup of the intermediate bearing takes up looseness in both bearings. The heavy spindle places a considerable lateral thrust on the intermediate bearing due to the fact of its considerable length and a convenient and readily operated adjustment means is of importance. The take-up means is illustrated in detail in Figure 15 and is partially shown in Figure 14.

For ease in this adjustment, the adjustment means is manipulated at the top of the particular cross wall 115 and a small cover plate 119 is provided in the cover of the headstock casing for access to the adjustment manipulating means. The recess 120 in the wall which contains the roller bearing 114 continues straight back and contains a pair of opposing toothed rings 121, 122 which have clutch teeth in inclined engagement at all times and functioning in this case as cams. Between adjacent teeth and between the plane edges 123 thereof the wedge-shaped tip 124 of a screw 125 is disposed. The screw extends loosely downwardly through a boss of the wall and is screwed through a plate 126 fixed on the boss.

A nut 127 is provided for setting the screw 125 in adjusted position. The plane engaged edges of the teeth of the rings are inclined downwardly and inwardly and the effect of moving the wedge screw downwardly is to spread the teeth and cause a camming action to ensue between the inclined faces of all the teeth. In this way the toothed rings 121, 122 are spread and the adjacent outer race or cup 128 of the tapered roller bearing is moved into closer proximity to the rollers and the outer tapered bearing is taken up due to the longitudinal shifting of the spindle and the movement of the attached inner race of the end bearing thereof into its cup.

The high speed range of the six speeds is obtained through a large gear 129 (see Figure 14) loosely rotatively mounted on the transmission shaft 113 on roller bearings 130. This loosely rotatively mounted gear 129 is coupled for rotation from its shaft 113 by means of a gear and clutch element 131 splined on the particular shaft and including a toothed clutch portion 131ª adapted to engage internal clutch teeth 132 formed in the large loosely mounted gear. This large gear meshes with a pinion 133 in keyed connection with the spindle. Therefore, it will be seen that a high speed range of six speeds ensues when the clutch portion 131ª is in engagement with the clutch teeth of the large gear 129 and a direct drive to the spindle occurs at this point. The shaft 113 is journalled at three bearings, the intermediate of which is between the large gear 129 and the compound gear 112.

The other two ranges are accomplished through a back gearing of the following nature. A stub shaft 134 is mounted on three bearings 135 respectively in two of the internal walls and the end wall of the casing. Between the two inner bearings a single gear 136 is keyed to the stub shaft and a long pinion gear 137 is formed as a part of the shaft between the intermediate bearing and the bearing at the end wall of the headstock. The clutch and gear element 131 is effective for transmitting drive to this last mentioned shaft 134 when out of clutch engagement with the large gear 129 since its gear portion 131ᵇ will mesh with the single gear 136 on the shaft 134.

The next stub shaft 138 is disposed in axial alignment with the transmission shaft 113 carrying the large gear and this shaft carries in splined connection a compound gear 139 including two gears 139ª, 139ᵇ. The large one 139ª is in constant mesh with the long pinion 137. These gears 139ª, 139ᵇ serve as component gears for engagement with the gears 140ª and 140ᵇ respectively of a compound gear 140 keyed to the spindle. Between this last mentioned compound gear 140 a neutral position is obtainable and both positions of mesh may occur without unmeshing of the large gear 139ª from the long pinion gear 137.

Therefore, two additional speed ranges are accomplished at this point, the drive connecting to the spindle between the intermediate bearing and the inner end wall bearing of the spindle and close to the work engaging end of the spindle. It will be understood that the first mentioned drive through the large gear 129 is the fast range and the last two drives represent the intermediate and slowest ranges. The gears causing the three speed ranges are controlled through the control cam 49 by a series of levers as hereinafter described.

Spindle transmission control

The multiple groove cams 49, 50 are mounted on the same axis at one side of the transmission casing preferably on that side of the lathe toward the carriage apron. The speed control cam 50 is fixed on a shaft 141 (see Figure 9) by means of a pin 142, the shaft being journalled in roller bearings 143 at its ends and an intermediate wall of the headstock casing. This cam contains two cam grooves, one for each of the levers 144, 145 which it operates. The other cam 49 is loosely mounted on the shaft on roller bearings 146, these roller bearings being spaced on the shaft by means of sleeves 147. This cam 49 also contains two grooves for operating respective gear shifting levers 148, 149.

The first mentioned cam 50 is rotated by means of a worm wheel 150 fixed on the end of the shaft 141 toward the inner end of the headstock casing. This worm wheel is in mesh with the worm 151 fixed on the end of a control shaft 152 extended through and journalled in the side wall of the headstock casing. The rotatable hand lever 44 including a pointer 154 is fixed to the outer end of the control shaft and is rotatable for moving the pointer relative to the markings on a speed indicator plate 155 fixed to the side face of the headstock casing. The control shaft is journalled in a roller bearing assembly 156 in a sleeve 157 fixed in the wall of the headstock casing.

The second cam 49 or the one controlling the speed ranges is rotated by means of a bevel gear 158 formed on its inner end and disposed in mesh with a bevel gear 159 keyed to a vertically suspended stub shaft 160 mounted in an extension element 161 of the frame in the bushing 162 thereof.

A plain gear 163 is formed as an integral part of the hub of the bevel gear 159 and is in mesh with a segmental gear 164 fixed on a control shaft 165 vertically mounted in the headstock casing within ball bearings 166. The control shaft 165 has a manipulating lever 43 pinned on its upper end and extended to the side of the headstock directly over the speed control lever 150

44. The three positions for this last mentioned lever 43 indicating speed range positions are shown by the insignia a, b, c, on the outer face of the headstock boss.

The indicator plate 155 relative to which the speed dial lever 44 operates includes three concentric rows of markings, each indicating six speeds in R. P. M. These sets are indicated from the center outwardly on the plate as a, b, c, and each row is indicative of the six speeds of a speed range. Since there are six stops for the speed control lever serving for all three ranges there are six radial rows of markings, each including a marking of each range. Therefore when the pointer finger of the speed dial lever 44 is in line or registers with a row of the radially disposed speed markings, the operator, to determine whether it is the a, b, c, speed range, notes the position of the speed range control lever 43 and reads in the corresponding concentric circle.

Detent devices 168 are provided for definitely setting the cams 49, 50 in their respective positions. The first cam or the speed control cam 50 has six notches in the peripheral flange thereof and the range control cam 49 has three notches in a peripheral flange, the notches being in accordance with the positions of these cams. These detents are mounted in the shifting lever support plate 126 bolted on the top of the main body portion of the headstock casing and beneath the cover thereof. Since the detent devices used for each of the cams are duplicates, the description will be confined to one.

Each detent device 168 consists of a lever 170 pivoted in bifurcated arms 171 formed on the bottom of the support plate 126 and includes a roller 172 at its outer end rolling over the periphery of the particular notched flange and successively engaging or registering with the arcuate notches 173 of the cams. The outer end of this lever 170 is urged downwardly by means of a spring urged detent plunger 174 moving in a vertical bore in the plate 126 and maintained for downward movement by means of a set screw 175 screwed in the bore from above.

The lever support plate is bolted in position and carries the four gear shift levers 144, 145, 148 and 149, two for each cam, each of these levers being fulcrumed on supporting studs 180 fixed in the plate. The general structure of levers is the same, each lever carrying a roller 181 at one end engaging its particular groove in the respective cams and each lever having a gear shifting element or yoke 182 pivotally mounted at the other or operating end.

In connection with the first or speed control cam 50, the first of these levers, namely 144, is extended to the compound gear 109 splined on the first shaft 101 of the transmission as extended from the power control clutch. The pivotally mounted yoke 182 of this lever 144 is engaged over the larger gear of the compound gear 109 and the cam groove operating this lever is effective for moving the compound gear 109 to two gear mesh positions relative to the gear 111. The other lever 145 of the speed control cam 50 has its shifting element 182 engaged between two of the gears of the next slidable compound gear 112 and is effective through its particular groove of the cam 50 for moving this compound gear into any one of three gear mesh positions relative to the gear 111, thus making the cam 50 effective for obtaining six speed changes.

These six speed changes are tripled by the operation of the speed range control cam 49. The speed range control cam 49 operates two levers, namely 148 and 149, the first of which through its shifting element 182 moves the gear and clutch element 131 either into mesh with the gear 136 for extended drive to the back gearing from the six speed shaft 113 or for permitting a direct drive from the six speed shaft 113 to the spindle. The back gearing is controlled through the other lever 149 of the speed range cam 49 which shifts the compound gear 139 of the back gearing into either of its two positions of mesh. The cam groove controlling the lever 149 and the gear 139 is formed so as to move the gear into a neutral position when the high speed range clutch is in and the spindle is being rotated at high rates of speed. This eliminates unnecessary back drive or idle and free movement of the back gearing and results in a quieter drive and less wear. Since the mesh of gears from the spindle through the back gearing is large to small the result of back rotation would be useless and unduly high speeds damaging to the transmission. Consequently the above arrangement is of great importance.

*Speeds and ranges*

Figure 17:
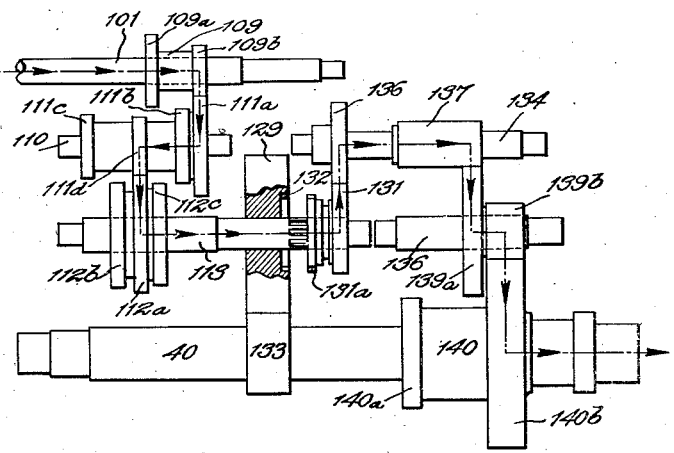
Figure 18:
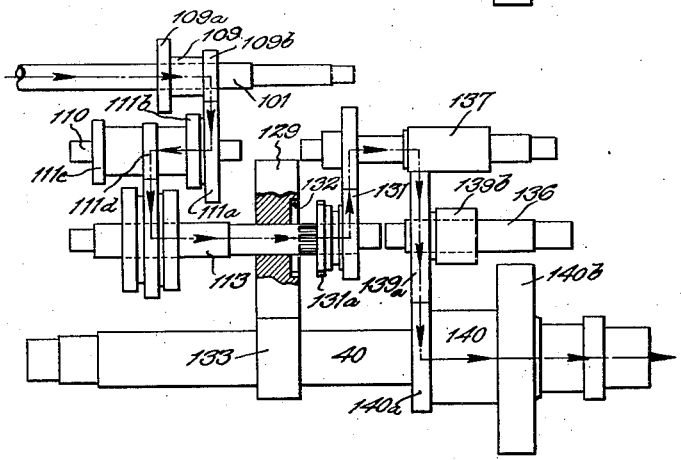

In connection with the speed changes, as appears in Figure 17, the lowest change of speed is being used and the lowest range of speed is being used. As between the showing in Figure 17 and that of Figure 20, the six speed changes take place and as will appear from Figure 20 the highest speed of the speed change is being used, still in conjunction with the lowest range of speed. Figure 18 shows the speed change gearing again in the lowest speed position but the speed range gearing is in intermediate speed range. The same six speed changes are carried through between the showing in Figures 18 and 21 as previously described in connection with Figures 17 to 20.

Figure 19:
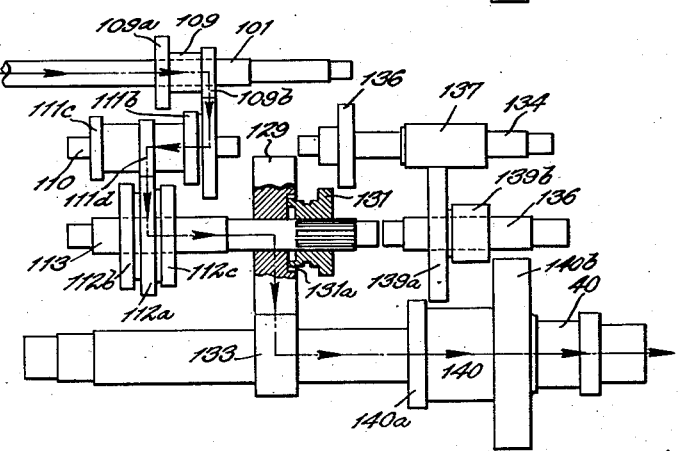
Figure 20:
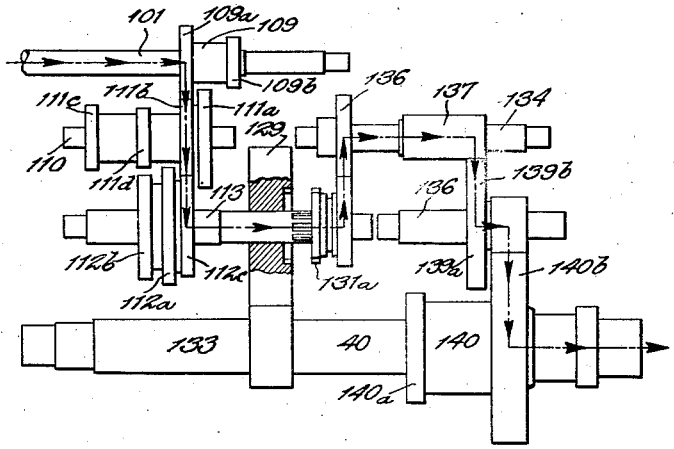
Figure 21:
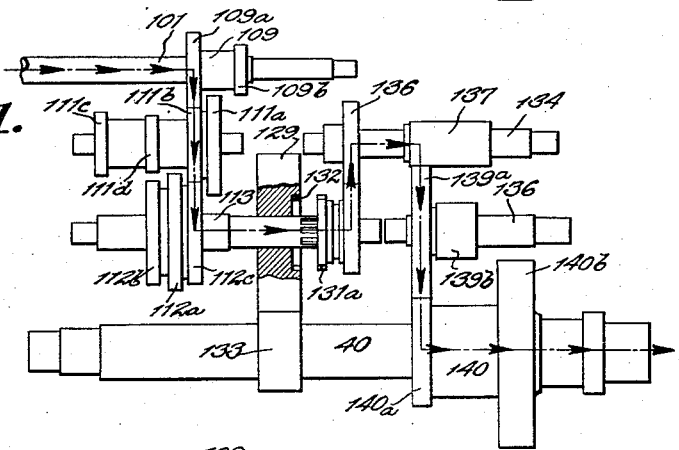
Figure 22:
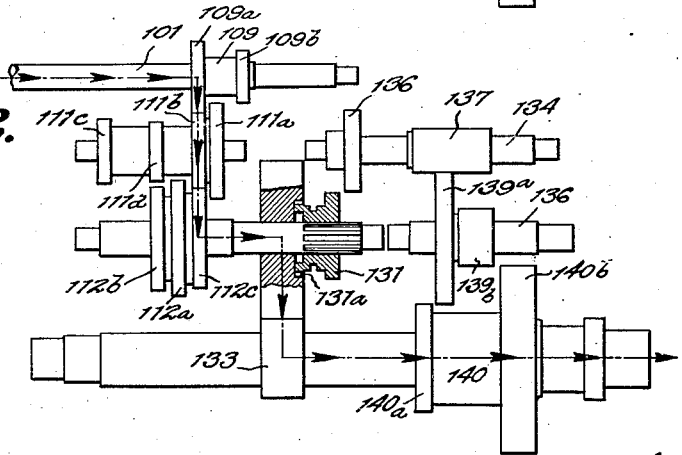

Figure 19 shows the lowest speed being used in the speed change gearing and the highest speed range or the direct drive range being used, cutting out the back gearing with the six speed changes occurring between the showing of Figures 19 and 22. In other words, Figures 17, 18 and 19 show the three speed range changes and Figures 20, 21 and 22 show the highest speeds for these speed ranges as opposed to the low speeds shown in the first mentioned views.

In some installations of headstock gearing it may be desirable to dispense with the speed change gearing and the control cam therefor, and to have a constantly meshing gearing 183 used in place thereof with the changes in speed obtained through a variable speed motor. Consequently Figures 23 to 25 illustrate, diagrammatically, the use of the speed ranges in conjunction with a non-variable transmission adapted to be driven by a variable speed motor 184. It will be understood that the use of a variable speed motor is readily possible without changing gearing as detailed in the present case. In other words, three of the gears in the present speed change gearing may be set in meshed position, for example, the large gear 109ª of the first compound gear 109 in mesh with the third largest gear 111ᵇ of the loosely mounted compound gear 111 and this gear in mesh with the smallest gear 112ᶜ of the compound slide gear 112 on the third shaft 113.

*Carriage transmission and control*

Beneath the transmission gearing for driving the spindle 40 is mounted a driving shaft 185 for extending the motive power to the carriage feed box 36 at the side of the lathe. This auxiliary power shaft 185 carries two gears 186, 187 loosely mounted thereon and in the casing walls. These gears are in mesh with component gears 188, 189 keyed to the spindle. Between component gears 186, 188 of these meshing gears a reversing or idler pinion 190 is interposed. The gears mounted on the auxiliary power shaft 185 rotate whenever the spindle is rotating.

Between these loosely mounted gears 186, 187 a clutch element 191 is interposed and slidably splined on the shaft 185, this element having clutch teeth on its respective ends 192 engageable with adjacent clutch teeth 193 on the adjacent loosely mounted gears 186, 187. A driving gear 194 is mounted on the exteriorly extended end of the auxiliary power shaft and extends the drive to the feed box 36 to the lead screw 34 and feed rod 35 of the carriage of the lathe through gears 195, 196 mounted at the end of the lathe.

The control lever 197 for effecting forward or reverse movement of the carriage or neutral position thereof is located at the carriage (see Figure 1). A bracket 198 depends from the carriage and carries the lever 197 loosely mounted therein for travel with the carriage, this lever being splined on a control shaft 199 extending longitudinally along the entire length of the lathe and loosely slidably journalled in brackets 200, at the respective ends thereof. As shown in Figure 12, this control shaft has a screw sleeve 201 fixed thereto having an extremely coarse pitch and screwed through a nut 202 bolted to the lathe body.

Since the control shaft 199 is slidably mounted in its bearings the result of rotation of the sleeve 201 in the nut 202 by means of the lever is to move the shaft 199 longitudinally. This longitudinal movement is conveyed from the control shaft 199 to another control or shift shaft 203 parallel therewith and in the headstock, by means of a lever 204 fulcrumed on a bracket 205 fixed to the lathe body and having its lower end attached for universal movement to the end of the control rod 199 and the upper end mounted for universal movement to the outer end of the control or shifting rod 199. The shifting rod 203 carries a shifting yoke 206 engageable with the clutch element 191 for controlling carriage feed.

The shifting rod 203 which is effective for moving the clutch element 191 has its movement controlled by means of an interlock plunger or detent 207 co-active between this shifting rod and the speed range cam 49 for the purpose of preventing movement of the shifting rod 203 at those times when the spindle is being driven at high speed. Therefore, the surface of the cam 49 is arranged for actuating the spring-urged plunger 207 for depressing the plunger into locked engagement with the shift rod only when the cam is set for the high range of spindle speed.

More specifically, the device for achieving this function is mounted in an internal wall 208 of the headstock casing between the cam 49 and the shift rod 203 and is slidably depressibly mounted within a sleeve 209 secured in the wall and maintained against rotation by a splined connection with the sleeve in the nature of a cross pin 210 in the plunger extended into longitudinal grooves 211 in the sleeve.

The spring 212 is interposed under compression between a shoulder 213 of the plunger and the base 214 of the counterbored portion containing the plunger. The upper end of the plunger carries a roller 215 in engagement with an eccentrically grooved portion 216 of the cam and the lower end is slidably mounted for movement into and out of a transverse notch 217 in the shift rod. The compression spring 212 urges the plunger upwardly against the cam and is effective for holding it in fully elevated position as permitted by the position of the eccentrically positioned portion of the cam. This holds the plunger out of the notch in the shift rod and permits normally shifting of the reversing gearing by the lever 197 on the carriage when the cam is in intermediate or low speed.

The transverse notch 217 in the shift rod is positioned longitudinally thereof so as to be aligned with the plunger when the clutch member is in forward driving position. Therefore, when the cam is set at high speed range the high portion of the cam formed surface depresses the plunger into the notch, thereby locking the shift rod in forward speed position and preventing reversal thereof while the cam is in the high speed range.

Thus it will be noted that through the general gear arrangement herein provided, eighteen speeds are included, there being six speeds controlled for driving the spindle in three different ranges. As described, a two-lever control is provided for changing the speeds of the spindle, the low, intermediate and high speed ranges being controlled by one lever, and the six speeds which are multiplied by the three ranges being controlled by the other lever. The control thus afforded is quite flexible since the operator can readily change from a speed in the low range to a speed in the high range merely by shifting the range control lever. In other words, as shown on the dial of Figure 3, he can shift from fifty-four R. P. M. to one thousand R. P. M. merely by moving the top or range control lever from A to C positions, or the most minute speed change is possible by moving the speed control lever as from fifty-four R. P. M. to forty-two R. P. M.

For the purpose of absolute convenience in chuck work, all of the control levers necessary for full control of the headstock are directed to points within a small compass immediately before the operator. Both the speed control lever and the speed range control lever, as well as the clutch control lever, have their handles disposed in this small compact area. In controlling the carriage movements, the operator at the time of the use of the high speed range cannot cause a reversal of the carriage, thus protecting the gearing against the high speeds which would cause damage to the reversing mechanism.

In all instances, the headstock gearing is efficiently journalled, the bearings being adjacent to the gears throughout the train in driving position, thus eleminating any deflections in the shafts. To prevent deflection and eliminate torsion, all of the shafts, with the exception of the spindle, are short stub shafts.

This headstock lends itself admirably to use with a variable speed motor since the speed transmission may be readily arranged or replaced by fixed gears of one to one ratio and the speed range control gearing used in the same manner as described with the speed variation obtained in a variable speed motor. This type of drive would eliminate all of the speed control mechanism and the cam 50 and its shifting levers.

The large gear and the pinion on the spindle, which gears are in constant mesh and which connect the power to the spindle for imparting the high speed range of the six normal speeds, are helical gears. This gear and pinion are of considerable width in order to provide greater tooth bearing at this point. Moreover, the helical teeth of these gears have a considerable pitch angle providing increased tooth contact at the point of mesh. The purpose of this type of tooth structure for these gears is to provide greater smoothness, quietness and additional contact for reducing wear and compensating for the extremely high pitch line velocity. The direction of pitch of the helical gears has been selected in relation to the direction of drive of the spindle so as to constantly urge the spindle longitudinally against the large tapered end thrust bearing at its inner end.

An additional function is derived from the use of these helical gears, which are in constant mesh, in that they tend to smooth out the drive to the spindle as obtained through the back gearing in addition to their normal smoothing function when used for the high speed range. Since the back gears for imparting the intermediate and low speed ranges to the spindle are straight gears, the overlapping of teeth and the driving of heavy loads, in due course, tends to create teeth marks which in time will cause looseness in the transmission and the result of this will be a slight oscillatory movement in the spindle rotation. At this time through the constant and considerable tooth contact between the pinion and the large gear there is less tendency for these teeth marks and oscillations to be created as the heavy bull gear tends to dampen the vibrations, creating the oscillations, due to its weight and the force required to idle or back drive the same.

The intermediate bearing for the spindle is located closer to that end bearing at the work engaging end of the spindle than it is to the other end bearing. The intermediate bearing and the adjacent end bearing are tapered roller bearings having their cups facing away from each other so that the effect of elongation of the spindle under temperature change would be to loosen these bearings. This arrangement of bearings is necessary, particularly at the work engaging end of the spindle for taking the inwardly directed work thrusts and at the intermediate bearing for the purpose of adjustment previously described. By placing the intermediate bearing close up to the aforesaid end bearing, the result is that due to the decreased length of spindle between these bearings very little elongation can take place between these bearings and loosening of the bearings is minimized.

The speed variations developed in the present headstock and the control devices therefor are quite adaptable to present day requirements, in that the general speed range is quite wide. The development of the speeds at the spindle does not occur by division of a certain number of speeds but occurs by the provision of a primary number of speed changes which are reconstituted by speed range gearing to provide three distinct ranges, one a range of extremely low speeds, another a range of extremely high speeds and an intermediate range if desired, and as herein disclosed.

As will be apparent from the dial through the use of appropriate gear ratio in the range control gearing, the highest speed of the low speed range is 54 R. P. M., and the lowest speed of the high speed range is 303 R. P. M. From these speeds as used in the present case, the flexibility of the transmission and its adaptability to use with high speed tools will be apparent, since the high speed range radically advances the rate of speed from the low speed range and is accomplished immediately by the shifting of a single lever, namely, the range control lever.

Having described my invention, I claim:

1. In a lathe headstock including the headstock casing and spindle journalled in said casing; a pinion fixed on the spindle, a large gear disposed for constant mesh with said pinion, a driving train of gears extending to said large gear and including shiftable gears, means for shifting said shiftable gears of the driving train for imparting different speeds therefrom, a second pinion fixed on said spindle, a shiftable gear adapted to be meshed with said second pinion on the spindle, a gear for driving said shiftable gear, a clutch and gear element adapted to be shifted for either connecting the driving train of gears directly to the first large gear or to said gear for driving said shiftable gear, and a common means for operating said clutch and gear element and said shiftable gear, whereby said shiftable gear is out of mesh with the second pinion on the spindle when the clutch and gear element is connecting said large constantly meshing gear to the driving train of gears.

2. In a lathe headstock including the headstock casing and a spindle mounted in said casing; a small gear fixed on the spindle, a large gear in constant mesh with said small gear, a driving train of gears extending to said large gear including shiftable gears, means for controlling said shiftable gears of the train, back gears fixed on said spindle, shiftable back gears adapted to be meshed with said back gears on the spindle, a shiftable element adapted to be shifted for either connecting the driving train of gears directly to the first large gear or to the shiftable back gears, and a common means for operating said shiftable element and said shiftable back gears, and moving said shiftable back gears out of mesh with the back gears on the spindle when the shiftable element is connecting said large constantly meshing gear to said driving train of gears.

3. A spindle driving transmission, comprising, pinions fixed to said spindle, a large gear constantly in mesh with one of said pinions, a shiftable back gear adapted to be meshed with another of said pinions, a speed change transmission for driving said gears, a control element adapted to alternately connect said speed change transmission to said gears, and a common means for shifting said control element and said shiftable back gear, whereby the shiftable back gear is always out of mesh when the drive is connected to the spindle through said large gear.

4. A spindle driving transmission, comprising, a helical gear fixed to the spindle, a large helical gear constantly in mesh with said helical gear on the spindle, a back gear fixed on the spindle, a shiftable back gear adapted to be meshed with said back gear on the spindle, a speed change transmission for driving said large helical gear and said shiftable back gear, a control element adapted to alternately connect said speed change transmission to said last named gears, and a common means for shifting said control element and said shiftable back gear, whereby when the shiftable back gear is in mesh the drive is connected to the spindle therethrough.

5. In a headstock gearing for driving the spindle of a lathe, a power shaft, a further shaft, an intermediate shaft, a compound gear on said intermediate shaft, shiftable compound gears on the power shaft and the further shaft, a common lever means for shifting these gears relative to the intermediate compound gear for imparting a plurality of speeds to the further shaft, a shiftable coupling element splined on said further shaft, a large gear loosely mounted on said further shaft, a pinion fixed on the spindle and disposed in mesh with said large gear, a back gear fixed on the spindle, back gearing for driving said back gear on the spindle, and a lever means for shifting said coupling element on the further shaft for either coupling the drive directly to the large gear or for coupling the drive to the back gearing.

6. In a headstock gearing for driving the spindle of a lathe, a power shaft, a further shaft, an intermediate shaft, a compound gear on said intermediate shaft, shiftable compound gears on the power shaft and the further shaft, a common lever means for shifting these gears relative to the intermediate compound gear for imparting a plurality of speeds to the further shaft, a shiftable coupling element, a large gear loosely mounted on said further shaft, a pinion fixed on the spindle and disposed in mesh with said large gear, a compound back gear fixed on the spindle, shiftable back gearing for driving said compound back gear on the spindle, and a common lever means for shifting said coupling element for either coupling the drive to the large gear for a direct drive to the spindle or for coupling the drive to the back gearing and shifting the back gearing for a plurality of speed ranges through the compound gear on the spindle.

7. In a lathe headstock including the headstock casing and a spindle journalled therein; a plurality of gears fixed on the spindle, a large driving gear disposed in constant mesh with the smallest of said gears on the spindle, a speed change transmission for driving said large gear, a back gearing extended from said speed transmission for driving the remainder of said gears on the spindle, a shiftable element for connecting said speed transmission to said large gear or to said back gearing, gear shift means in the back gearing for controlling the drive therefrom to the spindle, and a common control lever for actuating said gear shift means and said shiftable element connecting the speed change transmission to the large gear and to the back gearing, said control lever adapted for meshing the gears of the back gearing for drive to the spindle when the control element for connecting the speed change transmission is not connecting the drive to the large gear, and vice versa.

8. In a lathe headstock, a headstock casing, a spindle mounted in said casing, spindle transmission gearing mounted in said casing and including a driven gear fixed on an intermediate portion of the spindle, bearings for mounting said spindle including end bearings and an intermediate bearing, and adjustment means for adjusting the spindle bearings exteriorly of the headstock casing.

9. In a lathe headstock, a headstock casing, a spindle mounted in said casing, spindle transmission gearing mounted in said casing and including a driven gear fixed on an intermediate portion of the spindle, roller bearings for mounting said spindle including a straight roller end bearing, a tapered roller end bearing and a tapered roller intermediate bearing, said tapered bearings inclined toward each other, and an adjustment device for adjusting the intermediate bearing exteriorly of the headstock, said adjustment means active on the cup of the intermediate bearing and acting therefrom through the fixed inner races of the respective tapered bearings on the spindle and the spindle for forcing the race of the outer bearing into its cup.

10. In a lathe headstock, a headstock casing, a spindle mounted in said casing, bearings for journalling said spindle in the end walls of the headstock casing, an intermediate bearing mounted in the headstock casing and supporting the spindle adjacent to the end bearing at the work supporting end of the spindle, said intermediate bearing and said adjacent end bearing being of the tapered roller type and the other end bearing being of the straight roller type, the bearing cups of said tapered roller bearings facing away from each other and the inner races thereof being fixed on the spindle, whereby due to the short spindle length between the tapered roller bearings temperature changes causing expansion and elongation of the spindle between the tapered bearings are less effective for loosening these bearings.

11. In a lathe spindle transmission, a spindle, an internal cross wall in said headstock for intermediately supporting said spindle bearing, bearings in the end walls and the intermediate wall for journalling said spindle, a power shaft entered into said headstock at one end thereof, a speed change transmission extending from said power shaft and including short stub shafts journalled between one end wall and the intermediate wall, a pinion on said spindle driven by said speed change transmission, a back gearing disposed in the opposite end of the headstock from the speed change transmission, a back gear on the spindle adapted to be driven by said back gearing, and an element coupling the drive either to the pinion on the spindle or to the back gearing, whereby the speeds of the speed change transmission may be imparted to the spindle in a direct driving range or back gearing driving ranges.

12. In a machine of the class described, a work-supporting spindle, means for driving said spindle comprising two speed change gear systems, one providing a high velocity range suitable to the employment of tools formed of high speed cutting alloys, the other providing a low velocity range suitable to the employment of tools formed of relatively low speed cutting alloys, a shifting means for each of said gear systems, and a selector automatically rendering inactive one of said shifting means when the other is rendered active.

13. In a lathe headstock gearing, a spindle, a speed change transmission, a speed range change transmission adapted to be driven by said speed change transmission, a plurality of gears fixed on the spindle and adapted to be driven by component gears of the speed range change transmission, a shifting device for changing the gears of the speed change transmission, and a shifting device for changing the gears of the speed range change transmission, said speed range change transmission including a direct drive to the spindle for the high speed range and a back gearing drive for the low and intermediate ranges.

14. In a lathe headstock gearing, a spindle, a speed change transmission, a speed range change transmission adapted to be driven by said speed change transmission, a plurality of gears fixed on the spindle and adapted to be driven by component gears of the speed range change transmission, a shifting device for changing the gears of the speed change transmission, and a shifting device for changing the gears of the speed range change transmission, said speed range change transmission including constantly meshing helical gears driving the spindle for the high speed range and a back gearing drive for the low range.

15. In a lathe headstock gearing including a spindle driven thereby; speed gearing, speed range gearing driven by said speed gearing, a plurality of gears fixed to the spindle and driven by component gears of the speed range gearing, a shifting device for controlling the speed gearing, a shifting device for controlling the speed range gearing, levers for the respective shifting devices, said levers having their handles adjacently located and an indicator dial associated with said levers and adapted to be read in accordance with the co-related position of said levers.

16. A lathe headstock, comprising, a spindle, speed change gearing, speed range gearing driven by said speed gearing, a plurality of gears fixed to the spindle and driven by component gears of the speed range gearing, a shifting cam and levers operated thereby for controlling the speed gearing, a shifting cam and levers operated thereby for controlling the speed range gearing, hand levers for rotating the respective shifting cams, said levers having their handles adjacently located, and an indicator dial associated with said hand levers and adapted to be read in accordance with the co-related position of said hand levers.

17. In a spindle driving transmission, a speed transmission, a speed range transmission for multiplying the speeds of the speed transmission, levers and operating means for controlling the respective transmissions, said levers adjacently disposed, a dial associated with said levers, said dial disposed about the axis of rotation of the speed change lever and including a series of concentric circles, each circle having speeds indicated circumferentially therein and the respective circles indicating the speed ranges, and indicating means identifying the speed range control lever and the circles whereby the operator determines the speed at which the transmission is operating by observation of the particular circumferential reading and the particular circle to be read as determined by the position of the speed range control lever.

18. In a driving transmission, a speed transmission, a speed range transmission for multiplying the speeds of the speed transmission, levers and operating means for controlling the respective transmissions, a dial associated wih said levers, said dial disposed about the axis of rotation of the speed change lever and having concentrically circumferentially arranged sets of speed markings thereon, and means indicating the set of speed markings to be read in conjunction with the position of the speed range lever.

19. In a lathe, a bed, a headstock on said bed including a casing, and a spindle mounted in said casing; a spindle driving transmission, a lever and control means for said transmission, a driven shaft, a transmission for driving said driven shaft from said spindle, a reversing clutch for controlling said shaft driving transmission, means for operating said clutch, and an interlock between said clutch operating means and said transmission control means for preventing shifting of the clutch when high speeds are being imparted to said spindle.

20. In a lathe, a bed, a headstock on said bed including a casing, a spindle mounted in said casing, a spindle driving transmission, a speed change lever and control means for said spindle driving transmission, a driven shaft, a transmission for driving said driven shaft from said spindle driving transmission, means for controlling the shaft driving transmission and an interlock between said latter control means and said speed range control means for preventing shifting of the clutch when the high speeds of spindle drive are being used.

21. In a lathe headstock, a casing, a spindle mounted in said casing, bearings for journalling said spindle in the end walls of said casing, a driving transmission journalled in said casing, a helical pinion fixed on the spindle, and a helical gear included in the driving transmission and disposed in constant mesh with said pinion, said end bearing at the work holding end of the spindle disposed for taking inward longitudinal thrusts on the spindle and the pitch angle of the meshing helical gear and helical pinion being disposed for imparting a longitudinal driving thrust on the spindle against its end thrust bearing.

22. In a lathe, a spindle to be driven, bearings for journalling said spindle, a spindle driving transmission including a helical pinion fixed on the spindle and a helical gear for driving said helical pinion, said end bearing at the work holding end of the spindle disposed for taking inward longitudinal thrusts on the spindle and the pitch angle of the meshing gear and pinion disposed for imparting a longitudinal driving thrust on the spindle against its end thrust bearing.

23. In a lathe, a bed, a headstock mounted on said bed, a feed box fixed to the side of the bed, feed and screw shafts driven from said feed box, said shafts having translative connection to a carriage, a spindle mounted in said headstock, a variable speed transmission for driving said spindle at different ranges of speed, a transmission extending from said spindle to said feed box, a reversing clutch in said transmission, a control means for said reversing clutch, a control means for the speed ranges imparted to the spindle, and an interlock between said respective control means for preventing the operation of the carriage feed control means while the high speed range is being used for driving the spindle.

24. In a lathe, a lathe bed, a headstock mounted on said bed, a spindle journalled in said headstock, a variable speed transmission for driving said spindle, a set of speed gears in said transmission, shifting mechanism for controlling said gears, a set of speed range gears in said transmission for reconstituting the speeds of the speed gearing, a feed box including driving connections to a carriage for translating the same, a train of gears extending from said spindle to said feed box for the carriage, a reversing clutch in said gear train, a shift rod for shifting said reversing clutch, a lever control for said shift rod mounted on the carriage, a cam for controlling said speed range gearing, a lever for rotating said cam and effecting the shifting movements thereof, a detent between said cam and said shift rod, said shift rod having a notch adapted to be engaged by said detent, said cam having a peripheral formation for operating said detent for moving the same into registry with the notch when the cam is set for the high speed range of spindle speeds, said shift rod disposed in position of forward speed for the carriage when the detent is registered with the groove and the shift rod is locked against translative movement whereby there can be no shift when the high speeds are being used.

25. In a lathe, a lathe bed, a headstock mounted on said bed, a spindle journalled in said headstock, a variable speed transmission for driving said spindle, a set of speed gears in said transmission, shifting mechanism for controlling said gears, a set of speed range gears in said transmission for reconstituting the speeds of the speed gearing, a train of gears and driving means extending from said spindle to a carriage for translating the same, a reversing clutch in said gear train, a shift rod for shifting said reversing clutch, a lever for operating said shift rod, a cam for controlling said speed range gearing, a lever for rotating said cam and effecting the shifting movements thereof, a detent between said cam and said shifting rod, said shift rod having a notch adapted to be engaged by said detent, said cam having a peripheral formation for operating said detent for moving the same into the notch when the cam is set for the high speed range of spindle speed for locking the shift rod against translative movement whereby there can be no shift when the high speeds are being used.

WILLIAM G. HOELSCHER.